July 4, 1939.                    F. GÖTZ                    2,164,516
                    FRICTIONAL TRANSMISSION GEARING
                         Filed Feb. 16, 1937

INVENTOR:
FRANTISEK GÖTZ
BY Haseltine, Lake & Co.
ATTORNEYS

Patented July 4, 1939

2,164,516

UNITED STATES PATENT OFFICE 2,164,516

FRICTIONAL TRANSMISSION GEARING

Frantisek Götz, Prague, Czechoslovakia, assignor to the firm Limited Company formerly The Skoda Works, Pilsen, Prague, Czechoslovakia Application February 16, 1937, Serial No. 125,973
In Czechoslovakia February 25, 1936

5 Claims. (Cl. 74—198)

This invention relates to frictional transmission gearing of the type in which two friction domes are provided at the ends of a pivoted shaft and co-act with the inner wall of a friction drum.

In order to reduce the entire assembly to a manageable size the guides in which the friction domes are supported are relatively short, which leads to the disadvantage that the friction domes oscillate during the operation of the gearing, on account of inadequate guidance, with the result that the efficiency of the frictional gearing is reduced.

Forms of construction of the frictional transmission gearing according to the invention are shown, by way of example, and diagrammatically, in the accompanying drawing, in which:—

Figure 1:
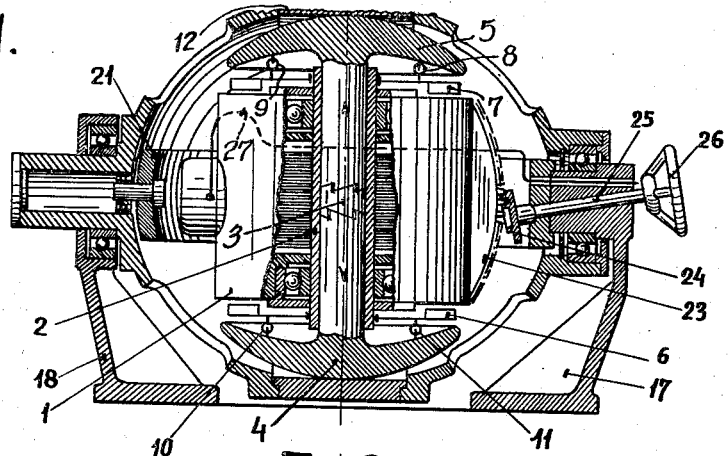
Fig. 1 is a longitudinal section of the frictional transmission gearing according to the invention.
Figure 2:
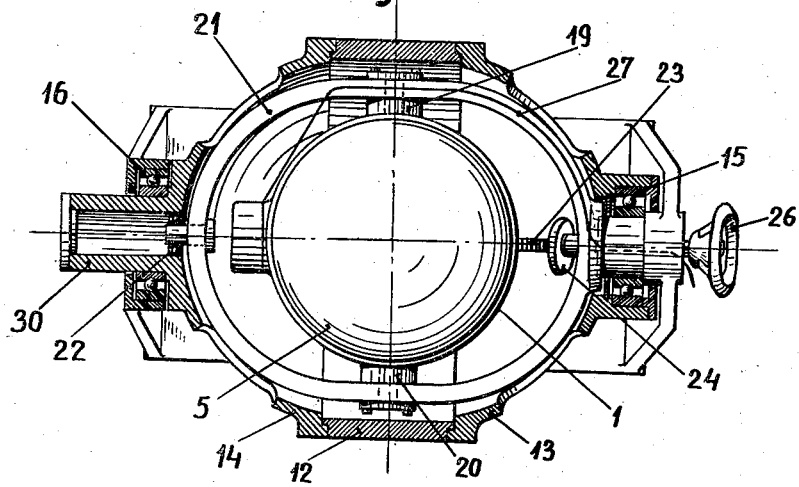
Fig. 2 is a sectional plan view of the same.

Referring to the drawing, the electromotor 1 is provided with a hollow shaft 2 which is firmly secured to the ring 3 having teeth. In this manner the hollow shaft 2 constitutes a sufficiently long guide for the support of the friction domes 4 and 5, the given length of the shaft being utilized to the full, so that the total assembly constituting the frictional transmission gearing is reduced to the smallest possible size determined by the dimensions of the electromotor. The teeth of the ring 3 have on both sides cuniform or helical surfaces with left- and right-hand pitch which engage in corresponding recesses in the pivot pins of the friction domes 4 and 5. To the hollow shaft 2 there are attached fans 6 and 7 for the motor 1. Between the fans 6 and 7 and the friction domes 4 and 5 there are located tension springs 8, 9, 10, and 11 which tend to twist the friction domes 4 and 5, so that these latter are pressed against the inner wall of the friction ring 12 by the action of the teeth on the ring 3. The friction ring 12 constitutes, together with the shields 13 and 14, the drum or shell of the gearing unit which is mounted in the bearings 15 and 16 supported in the brackets or stands 17 and 18. The electromotor is pivotally mounted in the journals 19 and 20 arranged in a looped frame 21 which is centred at one side in the bearing 22 and firmly attached at the other side to the stand 17. The electromotor 1 can be pivoted by any desired mechanism about the journals 19 and 20. In Figs. 1 and 2 there is shown, by way of example, pivoting by means of a worm wheel segment 23 and a spiral gear 24 adapted for rotation by means of a spindle 25 and hand-wheel 26. The shaft 25 and the cable 27 leading to the electromotor are taken out through the stand 17.

Figure 3:
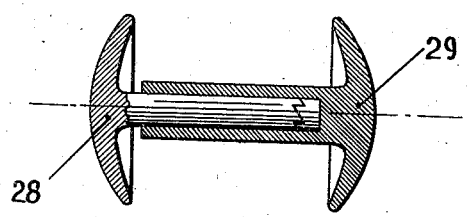
Fig. 3 shows a modified detail of the gearing.

In Fig. 3 there is shown, by way of example, a form of construction of the friction domes which differs from that shown in Fig. 1 in that the dome 28 is connected to the pin, while the dome 29 is connected to the hollow shaft. In this case also provision is made for the mutual pressing of the friction domes against the inner wall of the drum.

The mode of operation is as follows:

When the motor is in the intermediate position, shown in Fig. 1, during working, the driven shaft 30 is at rest. When the motor is swivelled towards the one side the drum rotates, and with it the driven shaft 30, in one direction. On going over to the zero position, which is indicated in Fig. 1, the drum is rotated in the opposite direction. The speed of rotation of the drum, and therefore also of the driven shaft 30, is dependent on the extent of the swivelling movement effected by means of the spiral gear 24. The resulting torque can be transmitted by means of the shaft 30 to which a clutch or a belt pulley is attached. Alternatively, the belt may be directly applied to the drum, that is to say to the ring 12.

The essential nature of the invention remains unaltered if instead of an electromotor a shaft driven in any other manner is employed as the driving member. The functions of the driving and driven shafts may also be changed about.

I claim:

1. Frictional transmission gearing comprising in combination a rotary friction shell, a hollow shaft mounted for rotary and swivelling movement in the said shell, two variably spaced convex friction elements disposed one at each end of the said shaft and guided therein and adapted to co-act with the inside surface of the said shell for frictional power transmission, and means for pressing the said convex friction elements axially away from each other against the inside wall of the shell.

2. Frictional transmission gearing according to claim 1, in which the convex friction elements are each provided with a central pin guided on the said hollow shaft.

3. Frictional transmission gearing comprising in combination a rotary friction shell adapted to serve as driven member, a hollow shaft adapted to serve as driving member mounted for rotary and swivelling movement in the said shell, two variably spaced convex friction elements disposed one at each end of and guided in the said hollow shaft and adapted to co-act with the inside surface of the said shell for frictional power transmission, means for pressing the said convex friction elements axially away from each other against the inside wall of the shell, and means such as an electromotor contained within the said shell for imparting power to the said hollow shaft.

4. Frictional transmission gearing comprising in combination a rotary friction shell, a hollow tubular shaft mounted for rotary and swivelling movement in the said shell, a convex friction element formed integrally with the outer end of the said hollow tubular shaft, a second convex friction element having a central pin guided in the said hollow tubular shaft and being variably spaced apart, and means for pressing the said convex friction elements axially away from each other against the inside wall of the shell for the purpose of frictional power transmission.

5. Frictional transmission gearing as claimed in claim 1, in which the means for pressing the friction elements against the shell comprise a toothed ring secured in the said hollow shaft and teeth on the central pin of the said friction elements adapted to engage the teeth on the said ring, the said teeth having inclined engaging flanks adapted to urge the friction elements away from each other on rotation of the said shaft and ring.

FRANTISEK GÖTZ.